United States Patent
Kim et al.

(10) Patent No.: US 11,252,599 B2
(45) Date of Patent: Feb. 15, 2022

(54) METHOD FOR SUPPORTING DEVICE-TO-DEVICE COMMUNICATION THROUGH BROADCAST AND GROUPCAST BASED ON QOS FLOW IN WIRELESS COMMUNICATION SYSTEM

(71) Applicant: Samsung Electronics Co., Ltd., Suwon-si (KR)

(72) Inventors: Sunghoon Kim, Suwon-si (KR); Hoyeon Lee, Suwon-si (KR); Sangyeob Jung, Suwon-si (KR)

(73) Assignee: Samsung Electronics, Suwon-Si (KR)

( * ) Notice: Subject to any disclaimer, the term of this patent is extended or adjusted under 35 U.S.C. 154(b) by 26 days.

(21) Appl. No.: 16/858,081

(22) Filed: Apr. 24, 2020

(65) Prior Publication Data

US 2020/0344637 A1    Oct. 29, 2020

(30) Foreign Application Priority Data

Apr. 26, 2019   (KR) .................. 10-2019-0049316

(51) Int. Cl.

| H04W 28/02 | (2009.01) |
|---|---|
| H04W 4/06 | (2009.01) |
| H04W 28/10 | (2009.01) |
| H04W 76/14 | (2018.01) |
| H04W 4/08 | (2009.01) |

(Continued)

(52) U.S. Cl.
CPC ......... *H04W 28/0268* (2013.01); *H04W 4/06* (2013.01); *H04W 4/40* (2018.02); *H04W 28/10* (2013.01)

(58) Field of Classification Search
CPC ..... H04W 28/0268; H04W 4/40; H04W 4/06; H04W 28/10; H04W 76/14; H04W 4/08; H04W 4/44; H04W 4/46; H04W 4/70; H04L 47/15; H04L 47/24

See application file for complete search history.

(56) References Cited

U.S. PATENT DOCUMENTS

2017/0142611 A1    5/2017  Andgart et al.
2018/0242115 A1    8/2018  Kim et al.
(Continued)

OTHER PUBLICATIONS

International Search Report and Written Opinion of the International Searching Authority in connection with International Application No. PCT/KR2020/005461 dated Jul. 30, 2020, 7 pages.

(Continued)

*Primary Examiner* — Harry H Kim (57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. One embodiment relates to a method and a device for processing an encoded UDC header in a next-generation mobile communication system.

20 Claims, 4 Drawing Sheets

(51) Int. Cl.
  *H04L 12/801* (2013.01)
  *H04L 12/851* (2013.01)
  *H04W 4/44* (2018.01)
  *H04W 4/46* (2018.01)
  *H04W 4/70* (2018.01)
  *H04W 4/40* (2018.01)

(56) References Cited

U.S. PATENT DOCUMENTS

| | | | | |
|---|---|---|---|---|
| 2019/0159072 A1* | 5/2019 | Zhu | .................. | H04W 28/0263 |
| 2019/0215685 A1* | 7/2019 | Wang | ....................... | H04W 8/22 |
| 2020/0100070 A1* | 3/2020 | Cheng | .................. | H04W 28/16 |
| 2020/0229198 A1* | 7/2020 | Kung | .................. | H04W 72/042 |
| 2020/0236578 A1* | 7/2020 | Cakulev | ................ | H04W 76/11 |
| 2020/0296619 A1* | 9/2020 | Pan | .................. | H04W 28/0268 |
| 2020/0396631 A1* | 12/2020 | Han | .................. | H04W 28/0215 |
| 2021/0084542 A1* | 3/2021 | Ahmad | .................. | H04W 28/24 |
| 2021/0185645 A1* | 6/2021 | Huang | .................. | H04L 5/0053 |
| 2021/0219168 A1* | 7/2021 | Liu | .................. | H04W 28/0268 |

OTHER PUBLICATIONS

European Search Report in connection with European Application No. 20171354.2 dated Sep. 11, 2020, 7 pages.

3GPP TR 38.885 V1.1.0 (Mar. 2019), Technical Report, 3rd Generation Partnership Project; Technical Specification Group Radio Access Network; NR; Study on Vehicle-to-Everything (Release 16), Mar. 2019, 111 pages.

3GPP TS 23.287 V0.3.0 (Apr. 2019), Technical Specification, 3rd Generation Partnership Project; Technical Specification Group Services and System Aspects; Architecture enhancements for 5G System (5GS) to support Vehicle-to-Everything (V2X) services (Release 16), Apr. 2019, 40 pages.

3GPP TR 23.786 V0.8.0 (Aug. 2018), Technical Report, 3rd Generation Partnership Project; Technical Specification Group Services and System Aspects; Study on architecture enhancements for EPS and 5G System to support advanced V2X services (Release 16), Aug. 2018, 78 pages.

Catt, "TS 23.287 PC5 QoS parameter provisioning," S2-1903522 (revision of S2-19xxxxx), SA WG2 Temporary Document, SA WG2 Meeting #132, Xi'an, China, Apr. 8-12, 2019, 4 pages.

Oppo, "Discussion on PC5 QoS Rule for Unicast," S2-1903223 (revision of S2-19xxxxx), SA WG2 Temporary Document, 3GPP TSG-SA WG2 Meeting #132, Xi'an, China, Apr. 8-12, 2019, 2 pages.

* cited by examiner

METHOD FOR SUPPORTING DEVICE-TO-DEVICE COMMUNICATION THROUGH BROADCAST AND GROUPCAST BASED ON QOS FLOW IN WIRELESS COMMUNICATION SYSTEM

CROSS-REFERENCE TO RELATED APPLICATION

This application is based on and claims priority under 35 U.S.C. 119 to Korean Patent Application No. 10-2019-0049316, filed on Apr. 26, 2019, in the Korean Intellectual Property Office, the disclosure of which is herein incorporated by reference in its entirety.

BACKGROUND

1. Field

The disclosure relates to a method for supporting device-to-device communication through broadcast and groupcast based on a quality-of-service (QoS) flow in a wireless communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System".

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

Vehicle-to-everything (V2X) is a general term that refers to any type of communication method applicable to road vehicles. With the development of wireless communication technology, V2X enables various additional services in addition to initial safety uses.

IEEE 802.11p and IEEE P1609-based Wireless Access In Vehicular Environments (WAVE) specifications have been standardized as V2X service providing technology. However, WAVE, which is a type of dedicated short-range communication (DSRC) technique, has a constraint of a limited message transmission distance between vehicles.

To overcome this constraint, standardization of cellular-based V2X technology is ongoing under the 3GPP. LTE system-based evolved packet system (EPS) V2X specifications have been established in Release 14/Release 15, and NR system-based 5th-generation system (5GS) V2X specifications are progressing in Release 16.

The above information is presented as background information only to assist with an understanding of the disclosure. No determination has been made, and no assertion is made, as to whether any of the above might be applicable as prior art with regard to the disclosure.

SUMMARY

According to one embodiment, an operating method of a first UE may include: obtaining first information for configuring a QoS flow; allocating a QoS flow ID, based on the first information; transmitting second information to an AS layer, based on the first information and the QoS flow ID; configuring QoS flow information in the AS layer, based on the second information; transmitting, by a V2X layer, a direct communication message to the AS layer by a broadcast or groupcast, based on the second information; and transmitting, by the AS layer, a direct communication response message, based on the direct communication request message and the second information.

According to one embodiment, an operating method of a first UE may include: receiving first information to be used for a V2X service from a 5G core network accessed by the first UE; configuring, by a V2X layer, a QoS flow ID, based on the received first information; and configuring, by the V2X layer, QoS flow information in an AS layer, based on the updated information.

According to one embodiment, there may be provided a method for performing broadcast or groupcast, based on a QoS flow when a device-to-device communication service is used in a wireless communication system.

According to one embodiment, broadcast or groupcast may be performed based on a QoS flow when used in a device-to-device communication service. Therefore, it is possible to apply a QoS flow-based operation used in unicast without needing to implement a different operation for broadcast or groupcast, thus reducing the complexity of UE operations.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the disclosure and its advantages, reference is now made to the following description taken in conjunction with the accompanying drawings, in which like reference numerals represent like parts.

DETAILED DESCRIPTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, the operation principle of the disclosure will be described in detail in conjunction with the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure uses terms and names defined in the 5G, new radio (NR), and long term evolution (LTE) system standards for the convenience of description. However, the disclosure is not limited by these terms and names, and may be applied in the same way to systems that conform other standards.

A detailed description of embodiments of the disclosure will be directed to communication standards defined by the 3GPP. However, based on determinations by those skilled in the art, the main idea of the disclosure may be applied to other communication systems having similar technical backgrounds through some changes and modifications without significantly departing from the scope of the disclosure.

Although embodiments disclosed herein are described in detail mainly with reference to a vehicle communication service, the main idea disclosed herein may be applied to other services provided by a 5G network via slight changes and modifications without significantly departing from the scope of the disclosure, which is possible by a judgment of a person skilled in the technical field of the disclosure. That is, a V2X layer disclosed herein may refer to an overall layer that performs a control operation for a device-to-device (D2D, or proximity service (ProSe)) communication service without being limited to a V2X service. The V2X layer refers to a layer that exists above an AS layer and exchanges signaling with the AS layer for a device-to-device communication connection.

A fifth-generation (5G) communication system considers supporting various services, compared to an existing fourth-generation (4G) communication system. For example, representative services include enhanced mobile broadband (eMBB), ultra-reliable and low-latency communication (URLLC), massive machine-type communication (mMTC), and evolved multimedia broadcast/multicast service (eMBMS). A system providing URLLC is referred to as a URLLC system, and a system providing eMBB is referred to as an eMBB system. The terms "service" and "system" may be interchangeably used.

URLLC is a service newly considered in the 5G communication system, rather than in the existing 4G communication system, and is required to meet the requirements of ultra-high reliability (e.g., a packet error rate of about 10-5) and low latency (e.g., about 0.5 msec), compared to other services. In order to satisfy these strict requirements, the URLLC service needs to apply a transmission time interval (TTI) shorter than that of the eMBB service, and various operating methods using a TTI are considered.

The Internet has evolved from a human-centered connection network, in which humans create and consume information, into an Internet of things (IoT) network, in which distributed components, such as objects, may exchange and process information. Internet-of-everything (IoE) technology, in which big-data processing technology is combined with the IoT through connection with a cloud server and the like, has also emerged. As technological elements such as sensing technology, wired/wireless communication and network infrastructure, service interface technology, and security technology are required to implement IoT, technologies for sensor networks, machine-to-machine (M2M) communication, and machine-type communication (MTC) have recently been studied for connecting objects.

Figure 1:
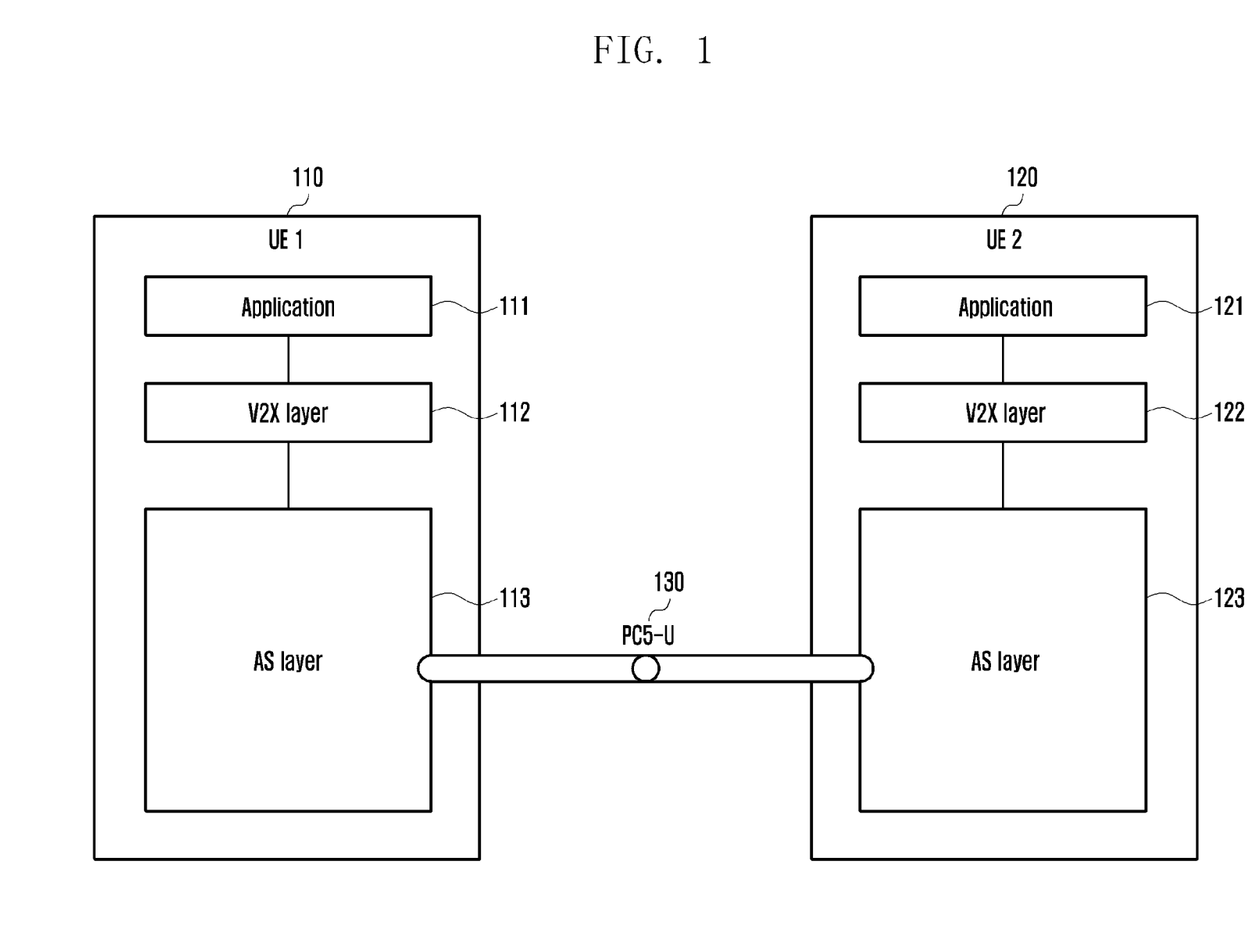
FIG. 1 illustrates a connection for performing broadcast transmission or groupcast transmission in device-to-device communication according to one embodiment.

FIG. 1 illustrates a connection configuration for direct communication between UEs according to one embodiment. Referring to FIG. 1, a user equipment (UE, which is interchangeable with a user terminal, a terminal, or a vehicle UE) may use direct communication (e.g., device-to-device (D2D), ProSe, Proximity-based Communication Interface 5 (PC5), or sidelink communication) to communicate with another UE (UE 2). In direct communication, message transmission and reception between UE 1 110 and UE 2 120 may be performed through a PC5 link 130. Here, when data is transmitted by broadcast or groupcast using direct communication, a user-plane connection called PC5-U may be used. That is, a message transmitted by a transmitting vehicle UE to a receiving vehicle UE may be transmitted to neighboring receiving UEs through a PC5-U link.

Referring to FIG. 1, a user-plane protocol stack of a UE includes an application layer 111, a V2X layer 112, and an access stratum (AS) layer 113. The AS layer 113 includes a service data adaptation protocol (SDAP) layer, a packet data convergence protocol (PDCP) layer, a radio link control (RLC) layer, and a media access control (MAC) layer, which may be collectively referred to as an AS layer for convenience. The SDAP layer may be used to transmit data for direct communication between UEs. For example, when establishing a 1:1 direct communication link between UEs and transmitting data through the established link (e.g., PC5 unicast communication), the SDAP layer may determine a QoS flow to be used to transmit the data. In addition, for example, when broadcast or groupcast is used for direct communication between UEs (e.g., PC5 broadcast communication), the SDAP layer may transmit data through a QoS flow corresponding to broadcast or groupcast.

The V2X layer disclosed herein may refer to an overall layer that performs a control operation for a device-to-device (D2D, or proximity service (ProSe)) communication service without being limited to a V2X service. The V2X layer refers to a layer that exists above an AS layer and exchanges signaling with the AS layer for a device-to-device communication connection. Further, the V2X layer may provide a data transmission function on a link established for direct communication between UEs. That is, the V2X layer may include an IP protocol, a non-IP protocol, and a transport protocol (e.g., TCP or UDP) for message transmission.

The UEs (UE 1 and UE 2) according to one embodiment may obtain and store the following information illustrated in Table 1 from a network in order to use a V2X service. The V2X layer may use the stored information.

TABLE 1

Policy/parameters

The mapping of service types (e.g. PSID or ITS-AIDs) to Tx Profiles.
The list of V2X services, e.g. PSID or ITS-AIDs of the V2X applications, with Geographical Area(s)
The mapping of service types (e.g. PSID or ITS-AIDs) to V2X frequencies
with Geographical Area(s).
The destination Layer-2 ID for PC5 unicast link establishment.
The list of V2X services, e.g., PSID or ITS-AIDs that are allowed to use a specific PQI(s)
The list of V2X services, e.g., PSID or ITS-AIDs that are configured to use PC5 broadcast or PC5 groupcast.

The V2X layer may store at least one of the information listed in Table 1 or may receive the same from the network. In addition, the information listed in Table 1 does not refer to all V2X service policy parameters configured or stored in the V2X layer and may include other information, for example, information for unicast communication or authorization information, in addition to the information listed herein.

Figure 2:
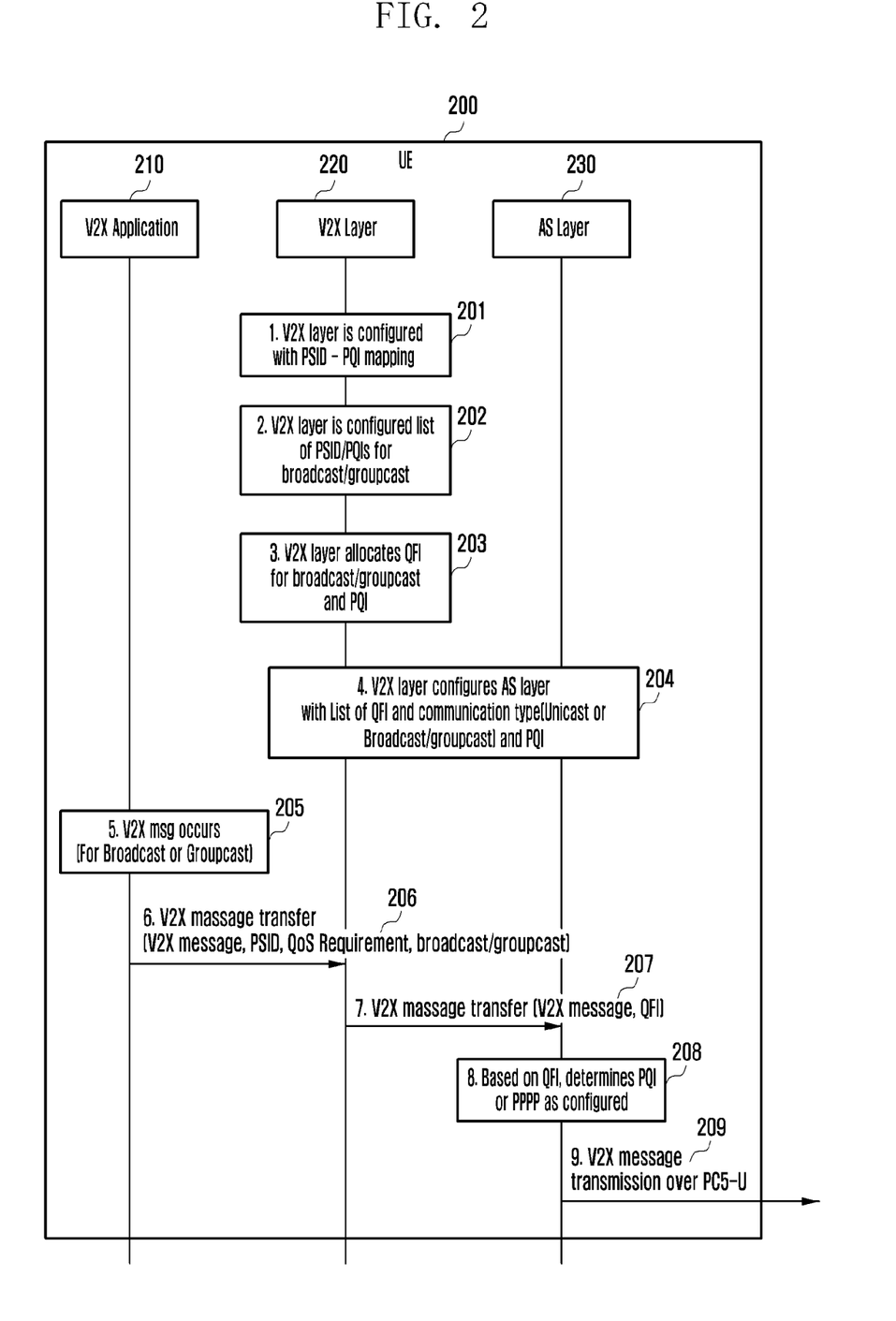
FIG. 2 illustrates a method in which necessary information is configured in an AS layer to use broadcast or groupcast and data is transmitted by broadcast or groupcast in device-to-device communication according to one embodiment.

FIG. 2 illustrates an AS layer configuration and data transmission method for PC5 broadcast or PC5 groupcast according to one embodiment.

A V2X layer 220 may receive and store at least one of the information listed in Table 1. In operation 201, the V2X layer 220 may store a configured provider service identifier (PSID) and binding information about a physical downlink shared channel resource element (RE) mapping and quasi co-location indicator (PQI) thereof. This information may be information preconfigured in a UE or information configured as information for a V2X service from a network. This information may be information indicating a PQI to be used for the PSID. Therefore, the V2X layer 220 may determine, based on the PQI, which QoS to apply for a message or data of a V2X service corresponding to the PSID.

Alternatively, the V2X layer 220 may receive and store information about whether to use broadcast/groupcast or to use unicast according to the PSID (operation 202). This information is configured in a list and may indicate a PSID for which broadcast/groupcast is used and a PSID for which unicast is used. This information may be information indicating applicability of unicast to a PSID by Yes or No. When the applicability of unicast is No, it may be determined that broadcast/groupcast needs to be used. Alternatively, each communication mode (broadcast, groupcast, and unicast) may be configured to be bound to a PSID. When it is configured that all of broadcast, groupcast, and unicast are possible for one PSID, the V2X layer 220 may determine that all of broadcast, groupcast, and unicast are possible for the PSID and may allocate a QoS flow for each communication mode.

The V2X layer 220 may store binding information about a PSID and a communication mode together with the information in operation 201. Here, the binding information may indicate a PQI to be used for a PSID and indicates whether a communication mode for the PSID is broadcast/groupcast or unicast. Further, information indicating a communication mode may be information indicating applicability of unicast by Yes or No. When the applicability of unicast is No, it may be determined that broadcast/groupcast needs to be used. This information may be configured in a list and may indicate binding information about each PSID that the UE can use.

In operation 203, the V2X layer 220 may perform an operation for allocating a QoS flow ID (hereinafter, "QFI"). The V2X layer 220 may allocate a QFI, based on the information described in operation 201 or operation 202. The V2X layer 220 may allocate the QFI using a method according to one of the following three embodiments. In the disclosure, a QFI allocated by the V2X layer 220 may be referred to as a PFI, which means a QFI used in PC5. Therefore, a QFI may be replaced with a PFI in the following detailed description.

1. The V2X layer may allocate a preset QFI value for broadcast/groupcast. For example, the V2X layer may allocate, for a PQI (one or a plurality of PQIs) available in broadcast/groupcast, an integer value corresponding to a priority among attributes of the PQI as a QFI value for broadcast/groupcast. That is, the priority value of a PQI corresponding to a ProSe per-packet priority (PPPP) used to transmit a V2X message per packet in existing LTE V2X may be used as it is as a QFI. Since any V2X message used in LTE V2X operate based on a per-packet, when the value corresponding to the PPPP is allocated and used as the QFI, the QFI value can autonomously represent the PPPP, and thus an AS layer 230 can apply broadcast/groupcast in the same manner as in LTE V2X. As a result, the QFI value may be allocated as shown below.

QFI=1 for Priority of PQI=1
QFI=2 for Priority of PQI=2
QFI=3 for Priority of PQI=3
QFI=4 for Priority of PQI=4
QFI=5 for Priority of PQI=5
QFI=6 for Priority of PQI=6
QFI=7 for Priority of PQI=7
QFI=8 for Priority of PQI=8

The above values may be already set in the AS layer 230. That is, when receiving V2X data corresponding to QFI=1, the AS layer 230 may determine that the priority value is 1 and may determine that the V2X data needs to be transmitted by broadcast/groupcast. When the value is already set in the AS layer 230, operation 204 may not be performed.

2. For a PSID determined for broadcast/groupcast, the V2X layer may allocate a different QFI for each PQI configured to be used for the PSID. Further, for a PSID determined for unicast, the V2X layer may allocate a different QFI even though it is configured to use the same PQI as a PQI available in broadcast/groupcast, which is for distinguishing a QFI for unicast from a QFI for broadcast/groupcast. Therefore, the QFI may be allocated as follows.

That is, although separate PSIDs have the same PQI, different QFIs may be allocated to the same PQI, and a QFI for unicast and a QFI for broadcast/groupcast are allocated to be different. As a result, it is possible to distinguish a PQI and to distinguish between unicast and broadcast/groupcast, based on a QFI value.

3. The V2X layer may allocate a QFI for one PQI per broadcast/groupcast rather than allocating a QFI per PQI per PSID. That is, a different QFI may be allocated for each PQI (one or a plurality of PQIs) configured to be used in broadcast/groupcast regardless of a PSID. That is, when it is determined that different PSIDs are configured to use broadcast/groupcast for the same PQI, only one QFI may be allocated for the PQI, and thus one or more PSIDs may use broadcast/groupcast using the same QFI. Therefore, the QFI may be allocated as follows.

Even though a QFI is not distinguished per PSID, broadcast/groupcast may be determined, through a layer-2 ID, by a receiving V2X UE as to which PSID a broadcast message or a groupcast message corresponds to. Therefore, it may be sufficient for a QFI to be used only for distinguishing a PQI at a transmitting end, because the AS layer 230 transmits V2X data by broadcast or groupcast according to a priority corresponding to a PQI, and an operation of the AS layer 230 applying a priority is irrelevant to a PSID. Here, even though it is configured to use the same PQI as a PQI available in broadcast/groupcast, a different QFI may be allocated for a PSID determined for unicast, which is for distinguishing a QFI for unicast from a QFI for broadcast/groupcast. This is because the operation of the AS layer 230 varies depending on a QFI in unicast, and the receiving UE needs to determine a QFI used to receive data and to determine a PSID for unicast corresponding to the QFI.

In operation 204, the V2X layer 220 may configure a list of a QFI allocated by the V2X layer and a PQI for the QFI for the AS layer 230. Here, the V2X layer 220 may also forward a communication mode to be used for the QFI. For example, the V2X layer may indicate and forward whether the communication mode is unicast or broadcast/groupcast or may separately indicate whether the communication mode is broadcast or groupcast. In another example, the V2X layer 220 may indicate and forward only whether the communication mode is unicast or not to the AS layer 230. Here, the AS layer 230 may determine that a QFI not indicated as unicast is a QFI for broadcast/groupcast. When receiving the list of the QFI allocated by the V2X layer 220 and the PQI for each QFI, the AS layer 230 may store this information. When the V2X layer 220 transmits data along with an indicator indicating a QFI, the AS layer 230 may determine a PQI corresponding to the QFI from the stored information and may accordingly transmit the V2X data by applying a priority for using a radio resource or QoS. Further, the AS layer 230 may determine which communication type is used (whether unicast is used or broadcast/groupcast is used), based on the indicator indicating the QFI transmitted along with the data by the V2X layer 220 and may accordingly determine a PC5 transmission method.

Operation 201 to operation 204 may be performed under at least one of a condition that the V2X layer 220 receives a PQI value available for each PSID, a condition that the V2X layer 220 does not allocate a QFI, or a condition that a QFI allocated by the V2X layer 220 is no longer valid and a new QFI needs to be allocated. Alternatively, operation 201 to operation 204 may be performed when the V2X UE is initially powered on. Alternatively, operation 201 to operation 204 may be performed when the V2X UE receives an updated parameter or policy needed for a V2X service from a network. Alternatively, when a V2X application is installed and requests a device-to-device transmission configuration for a V2X service, operation 201 to operation 204 may be performed accordingly. Alternatively, when a V2X application transmits data as in operation 206, operation 201 to operation 204 may be performed while configuring a transmission method for the data.

An application layer (V2X application) 210 of the UE to perform an application operation may provide the V2X layer 220 with at least one of an application message (hereinafter, referred to as a message, which may be interchanged with service data, data, or application data or may be referred to as a V2X message or V2X data) generated by the application layer 210, a message type (interchangeable with a service type) indicating the type of a message, a communication type or communication mode (e.g., broadcast, groupcast, unicast, or the like) indicating the communication method of a message, an application-layer identifier (ID) of the UE, and QoS requirements (operation 206). In vehicle communication, a PSID, an ITS-AID, or the like may be used as the message type.

The V2X layer 220 of the UE may determine whether to perform a link connection setup procedure, based on communication mode information received from the application layer 210 in operation 206. For example, when the communication mode received from the application layer 210 is PC5 broadcast or PC5 groupcast, the V2X layer 220 may perform an operation of requesting data transmission from the AS layer 230. In another example, when the communication mode received from the application layer 210 is PC5 unicast, the V2X layer 220 may determine to perform a link connection setup procedure and may perform a PC5 unicast link establishment procedure. The disclosure is described with reference to PC5 broadcast and PC5 groupcast.

The V2X layer 220 may identify the information configured through operation 201, operation 202, and operation 203 and the QFI allocated by the V2X layer. That is, the V2X layer 220 may determine whether to use PC5 broadcast or PC5 groupcast and may determine a PQI corresponding to a QFI for transmission, based on the information received from the V2X application in operation 206. Such determination is based on values set and allocated through operation 201 to operation 203. The V2X layer 220 may set source layer-2 and destination layer-2 IDs and may configure data payload or V2X data (or a V2X message) in order to transmit the application data received in operation 206. When the V2X layer 220 determines a QFI for transmitting this data, the V2X layer 220 may transmit the V2X data, along with a QFI value, to an SDAP layer of the AS layer 230. In operation 208, the SDAP layer, which is one layer of the AS layer 230 of the UE, may transmit a message using information associated with the QFI received from a message of operation 207. That is, the SDAP layer may determine a PQI corresponding to the QFI received in operation 207 and a communication type to be used for the QFI, that is, PC5 broadcast or PC5 groupcast, based on a value set in operation 204. The SDAP layer may transmit necessary information and the V2X data to a PDCP layer, an RLC layer, and a MAC layer in order to transmit the data via a logical channel corresponding to PC5 broadcast or PC5 groupcast. Here, the SDAP layer may also transmit a PQI value corresponding to the QFI or a value indicating a priority among PQI values to the PDCP layer, the RLC layer, and the MAC layer. The V2X data may be subjected to application of a priority according to the PQI value via a PHY layer corresponding to the logical channel identified by the MAC layer and may then be transmitted to the UE in operation 209.

Upon receiving the application data, the PHY layer of the UE forwards the application data to the MAC layer. The MAC layer may determine that the received message is a data message, based on the logical channel ID of a MAC header of the received message and may transmit the message to the V2X layer 220 via the RLC layer, the PDCP layer, and the SDAP layer. The V2X layer 220 may determine whether the received message is a PC5 broadcast message or a PC5 groupcast message, based on the destination layer-2 ID of the received message. When the received message is a PC5 broadcast message or a PC5 groupcast message, the V2X layer 220 may determine whether the message received from the SDAP layer is a V2X data message and may then transmit the received application data to the application layer 210.

Figure 3:
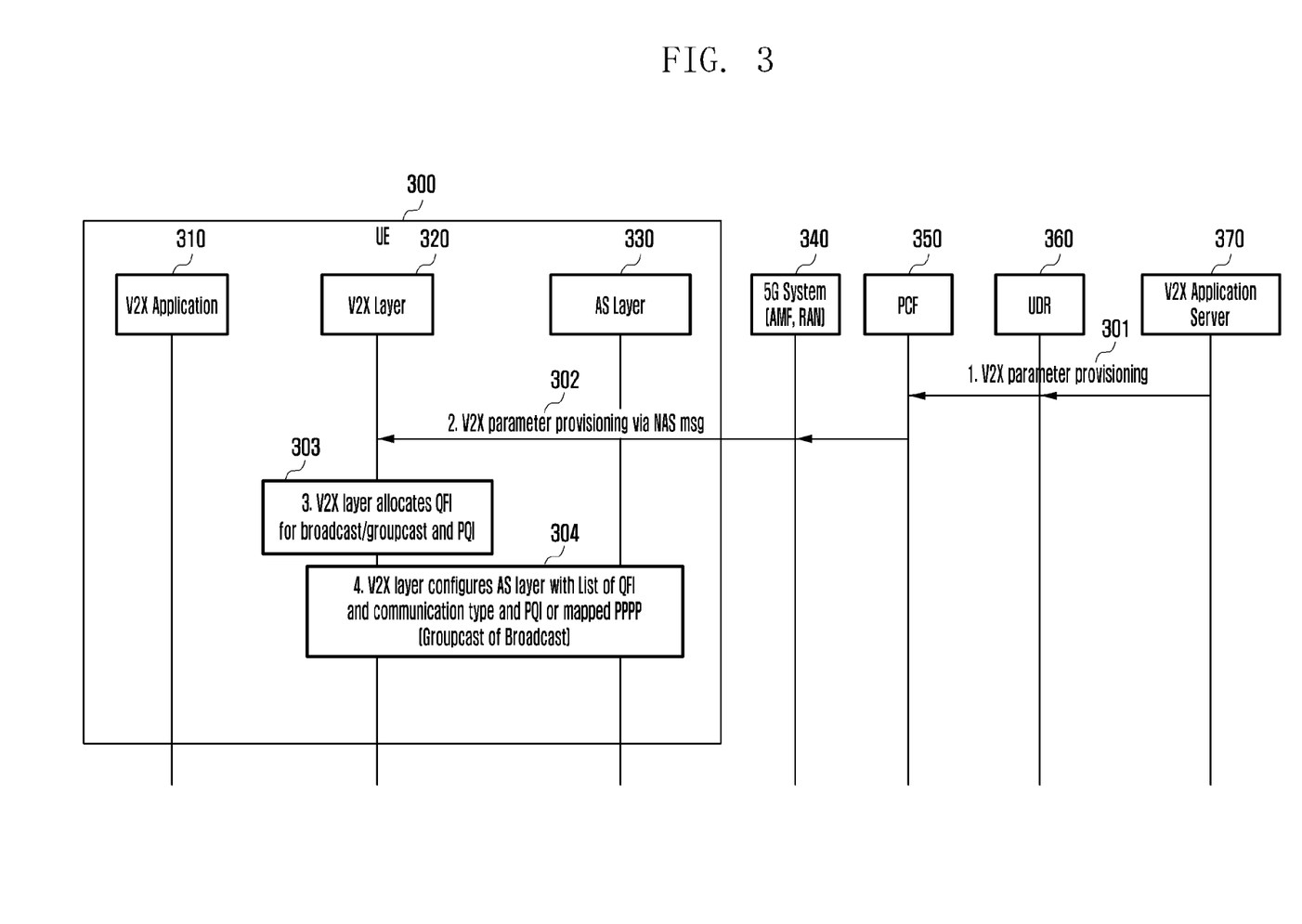
FIG. 3 illustrates a procedure in which a UE obtains service information from a network by request from the network and configures the service information in an AS layer according to one embodiment.

FIG. 3 illustrates a procedure in which a UE 300 is provided with a parameter or policy for a V2X service or receives an updated parameter or policy therefor from a V2X application server 370 or a 3GPP system and applies the parameter or policy to a V2X service. A policy control function (PCF) 350 may obtain a V2X service parameter to be applied to the UE from a unified data repository (UDR) 360 by various methods. For example, the V2X application server 370 may update the V2X service parameter to the UDR 360 through an Network Exposure Function (NEF), and the PCF 350 may obtain the V2X service parameter from the UDR 360, which corresponds to operation 301. Due to the operation of the V2X application server 370, the UDR 360 can provide the V2X service parameter to the PCF 350 when updating of the V2X service parameter is needed. Alternatively, the PCF 350 may request and obtain the V2X service parameter from the UDR 360. The V2X service parameter provided by the UDR 360 to the PCF 350 may include service policy/parameter information as illustrated in Table 1 disclosed herein.

The PCF 350 provides policy information to be applied to the UE to an access and mobility management function (AMF) 340 according to operation 302. Here, the V2X service parameter received from the UDR 360 may be included in the policy information. The service policy/parameter information (e.g., the V2X service policy parameter illustrated in Table 1) may be transmitted to the AMF 340 via a Namf_Communication_N1N2MessageTransfer message. The Namf_Communication_N1N2MessageTransfer message may include a Subscription Permanent Identifier (SUPI), a UE policy container, and the like. The AMF 340 may transmit the parameter information for the V2X service, received from the PCF 350, to the UE, in which a registration procedure or a UE configuration update procedure may be used. Alternatively, when the UE is in a connected state, a downlink NAS message transmission procedure for forwarding a policy may be used. The parameter or policy information for providing the V2X service may include at least one of the service policy/parameter information (e.g., the information in Table 1) disclosed herein. Upon receiving information about a UE policy, the UE may store the information in the UE and may transmit a response message indicating an acknowledgement of the information to the AMF 340. The AMF 340 may notify the PCF 350 that the service policy/parameter information (e.g., the V2X service policy parameter illustrated in Table 1) has been successfully transmitted to the UE. Here, the message may be Namf_N1MessageNotify. The PCF 350 may maintain the UE policy and may notify the UDR 360 about the updated UE policy.

Upon receiving the parameter or policy information for the V2X service in operation 302, the UE may perform operation 201 to operation 203 in FIG. 2. Accordingly, a V2X layer 320 may allocate a QoS flow ID for broadcast/groupcast for each PQI (operation 303).

In operation 304, the V2X layer 320 may configure a list of a QFI allocated by the V2X layer and a PQI for the QFI for the AS layer 330. Here, the V2X layer 320 may also forward a communication mode to be used for the QFI. For example, the V2X layer may indicate whether the communication mode is unicast or broadcast/groupcast or may separately indicate whether the communication mode is broadcast or groupcast. In another example, the V2X layer 320 may indicate and forward only whether the communication mode is unicast or not to the AS layer 330. Here, the AS layer 330 may determine that a QFI not indicated as unicast is a QFI for broadcast/groupcast. When receiving the list of the QFI allocated by the V2X layer 320 and the PQI for each QFI, the AS layer 330 may store this information. When the V2X layer 320 transmits data along with an indicator indicating a QFI, the AS layer 330 may determine a PQI corresponding to the QFI from the stored information and may accordingly transmit the V2X data by applying a priority for using a radio resource or QoS. Further, the AS layer 330 may determine which communication type is used (whether unicast is used or broadcast/groupcast is used), based on the indicator indicating the QFI transmitted along with the data by the V2X layer 320 and may accordingly determine a PC5 transmission method.

The procedure in which the UE obtains a service parameter/policy from a network and configures a QoS flow ID for the AS layer 330 illustrated in operation 301 to operation 304 may be equally applied to other UE.

Figure 4:
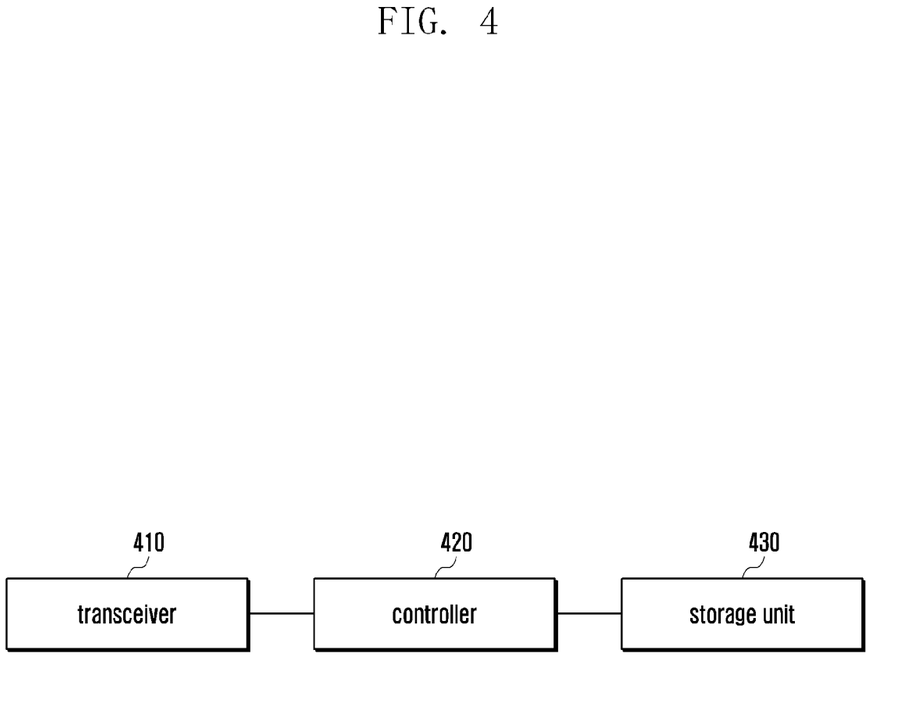
FIG. 4 illustrates the structure of a UE according to one embodiment.

FIG. 4 illustrates the structure of a UE according to one embodiment.

Referring to FIG. 4, the UE may include a transceiver 410, a controller 420, and a storage unit 430. In the disclosure, the controller may be defined as a circuit, an application-specific integrated circuit, or at least one processor.

The transceiver 410 may transmit and receive signals to and from a different network entity. For example, the transceiver 410 may receive system information from a base station and may receive a synchronization signal or a reference signal.

The controller 420 may control the overall operation of the UE according to an embodiment proposed herein. For example, the controller 420 may control the flow of signals between blocks to perform an operation according to the flowcharts described above.

The storage unit 430 may store at least one of information transmitted and received through the transceiver 410 and information generated through the controller 420.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a first entity in a terminal in a wireless communication system, the method comprising:
   determining Proximity-based Communication Interface 5 (PC5) Quality of Service (QoS) parameters based on a PC5 QoS mapping configuration;
   assigning, by the first entity, a PC5 QoS Flow Identifier (PFI), wherein the PFI is associated with the PC5 QoS parameters; and
   transmitting, to a second entity in the terminal, the PFI and the PC5 QoS parameters.

2. The method of claim 1, further comprising:
   transmitting, to the second entity, a vehicle-to-everything (V2X) service data along with the PFI.

3. The method of claim 2, further comprising:
   transmitting, to the second entity, a communication mode related to the PFI before the transmitting the V2X service data.

4. The method of claim 3,
   wherein the communication mode is broadcast or groupcast.

5. The method of claim 1,
   wherein the PC5 QoS mapping configuration includes a Provider Service Identifier (PSID).

6. A method performed by a second entity in a terminal in a wireless communication system, the method comprising:
   receiving, from a first entity in the terminal, a Proximity-based Communication Interface 5 (PC5) Quality of Service (QoS) Flow Identifier (PFI) and PC5 QoS parameters,
   wherein the PC5 QoS parameters are determined by the first entity, based on a PC5 QoS mapping configuration, and
   wherein the PFI associated with the PC5 QoS parameters is assigned by the first entity.

7. The method of claim 6, further comprising:
   receiving, from the first entity, a vehicle-to-everything (V2X) service data along with the PFI; and
   transmitting, to another entity, a message including the V2X service data based on the PFI.

8. The method of claim 7, further comprising:
   receiving, from the first entity, a communication mode related to the PFI before receiving the V2X service data.

9. The method of claim 8,
   wherein the communication mode is broadcast or groupcast.

10. The method of claim 6,
    wherein the PC5 QoS mapping configuration includes a Provider Service Identifier (PSID).

11. A first entity in a terminal in a wireless communication system, the first entity comprising:
    a transceiver configured to transmit and receive signals to and from other entities; and
    a controller operably connected to the transceiver, the controller configured to:
       determine Proximity-based Communication Interface 5 (PC5) Quality of Service (QoS) parameters based on a PC5 QoS mapping configuration,
       assign, by the controller of the first entity, a PC5 QoS Flow Identifier (PFI), wherein the PFI is associated with the PC5 QoS parameters, and
       transmit, to a second entity in the terminal, the PFI and the PC5 QoS parameters.

12. The first entity of claim 11, wherein the controller is further configured to transmit a vehicle-to-everything (V2X) service data along with the PFI to the second entity.

13. The first entity of claim 12, wherein the controller is further configured to transmit a communication mode related to the PFI to the second entity before the V2X service data is transmitted.

14. The first entity of claim 13,
    wherein the communication mode is broadcast or groupcast.

15. The first entity of claim 11,
    wherein the PC5 QoS mapping configuration includes a Provider Service Identifier (PSID).

16. A second entity in a terminal in a wireless communication system, the second entity comprising:
    a transceiver configured to transmit and receive signals to and from other entities; and
    a controller operably connected to the transceiver, the controller configured to receive, from a first entity in the terminal, a Proximity-based Communication Interface 5 (PC5) Quality of Service (QoS) Flow Identifier (PFI) and PC5 QoS parameters,
    wherein the PC5 QoS parameters are determined, by the first entity, based on a PC5 QoS mapping configuration, and
    wherein the PFI associated with the PC5 QoS parameters is assigned by the first entity.

17. The second entity of claim 16, wherein the controller is further configured to:
    receive from the first entity, a vehicle-to-everything (V2X) service data along with the PFI; and
    transmit, to another entity, a message including the V2X service data based on the PFI.

18. The second entity of claim 17, wherein the controller is further configured to receive a communication mode related to the PFI from the first entity before the V2X service data is received.

19. The second entity of claim 18,
    wherein the communication mode is broadcast or groupcast.

20. The second entity of claim 16,
    wherein the PC5 QoS mapping configuration includes a Provider Service Identifier (PSID).

* * * * *

UNITED STATES PATENT AND TRADEMARK OFFICE
CERTIFICATE OF CORRECTION

PATENT NO. : 11,252,599 B2  
APPLICATION NO. : 16/858081  
DATED : February 15, 2022  
INVENTOR(S) : Kim et al.

Page 1 of 1

It is certified that error appears in the above-identified patent and that said Letters Patent is hereby corrected as shown below:

On the Title Page

Item (54), and in the Specification Column 1 Line 4, "BASED ON QOS FLOW IN WIRELESS" should read: --BASED ON QoS FLOW IN WIRELESS--.

Item (73), Line 1, "Samsung Electronics" should read: --Samsung Electronics Co., Ltd.--.

Signed and Sealed this  
Seventeenth Day of May, 2022

Katherine Kelly Vidal  
*Director of the United States Patent and Trademark Office*